United States Patent
Liu et al.

(10) Patent No.: US 7,256,625 B2
(45) Date of Patent: Aug. 14, 2007

(54) COMBINED OUTPUT DRIVER

(75) Inventors: Wen-Bo Liu, Taipei (TW); Yu-Feng Cheng, Taipei (TW); Ken-Ming Li, Taipei (TW); Vai-Hang Au, Taipei (TW)

(73) Assignee: Via Technologies, Inc., Taipei (TW)

( * ) Notice: Subject to any disclaimer, the term of this patent is extended or adjusted under 35 U.S.C. 154(b) by 386 days.

(21) Appl. No.: 10/976,148

(22) Filed: Oct. 28, 2004

(65) Prior Publication Data

US 2005/0088431 A1    Apr. 28, 2005

Related U.S. Application Data

(60) Provisional application No. 60/514,606, filed on Oct. 28, 2003.

(51) Int. Cl.
*H03K 3/00* (2006.01)

(52) U.S. Cl. .................................. 327/112; 327/391
(58) Field of Classification Search ............... 327/112, 327/391
See application file for complete search history.

(56) References Cited

U.S. PATENT DOCUMENTS

| | | | | |
|---|---|---|---|---|
| 5,610,544 A | * | 3/1997 | Aoki | 327/198 |
| 5,949,253 A | * | 9/1999 | Bridgewater, Jr. | 326/86 |
| 6,366,128 B1 | * | 4/2002 | Ghia et al. | 326/83 |
| 6,437,599 B1 | * | 8/2002 | Groen | 326/63 |
| 6,486,710 B1 | * | 11/2002 | Simoni | 327/63 |
| 6,590,432 B1 | * | 7/2003 | Wu et al. | 327/108 |

* cited by examiner

*Primary Examiner*—Kenneth B. Wells
*Assistant Examiner*—Ryan C. Jager
(74) *Attorney, Agent, or Firm*—Thomas, Kayden, Horstemeyer & Risley

(57) ABSTRACT

A combined output driver for TMDS signals and LVDS signals. A first output driver includes a first differential unit generating a first differential according to first input signals in a first mode and a first clamping device coupled between the first node and the first differential unit to clamp potentials at two power terminals below a second power voltage. The second output driver includes a second differential unit generating a second differential signal according to second input signals in a second mode and a second clamping device to clamp potentials at two output terminals of the second differential unit below the second power voltage.

24 Claims, 15 Drawing Sheets

COMBINED OUTPUT DRIVER

This application claims the benefit of U.S. Provisional application No. 60/514,606, filed on Oct. 28, 2003.

BACKGROUND

The invention relates to a transmitter, and more particularly, to a combined transmitter capable of transmitting low voltage differential signaling (LVDS) and transition minimized differential signaling (TMDS).

Low Voltage Differential Signaling (LVDS) is a high-speed, low power interface used by most notebook computer manufactures to create a direct digital connection between the central processing unit (CPU) and LCD display. It provides very high line transmission rate, requires little power and generates low noise levels. LVDS technology, optimized for short cable runs in an effort to transition LVDS technology to external desktop monitors failed.

FIG. 1A shows a conventional LVDS transmitter 10. The LVDS transmitter 10 converts data (RED, GREEN, BLUE, HSYNC, VSYNC and DE) and input clock CLKIN to data streams for output to a corresponding receiver through signal lines by output drivers 141. FIG. 1B is a diagram of the output driver 141 and a corresponding input unit 181 of the receiver (not shown). As shown, the LVDS output driver 141 is a current mode line driver, creating a differential voltage at the input unit 182 of the receiver 18 by current steering. For example, the current Iref flows to ground through the signal line 19, the terminal impedance 2RT of about 100Ω and the signal line /19 by turning on switches A and the switches B off, and vice versa.

Transition Minimized Differential Signaling (TMDS) is an electrical standard used to transmit digital data to a display. The signal is optimized to reduce electromagnetic interference (EMI), which allows faster signal transfer with increased accuracy. The differential circuitry in TMDS allows complimentary limited amplitude signals to be transmitted over twisted pair wires rather than more expensive coaxial cable. The LVDS transmitter encodes and serially transmits a data stream over a TMDS link to a TMDS receiver. Video and sync information are serialized and sent over three sets of twisted pair wires, with an additional pair of wires transmitting a clock signal for timing.

FIG. 2A is a block diagram of a conventional TMDS transmitter 20. TMDS transmitter 20 converts video and sync information (R, G, B, HSYNC, VSYNC and DE) and input clock CLKIN to data streams for output to the corresponding receiver through signal lines by output drivers 142. FIG. 2B is a diagram of the output driver 141 and a corresponding input unit 182 of the receiver.

As shown in FIG. 2B, the TMDS output driver 142 is a current mode line driver, generating a differential signal over lines 191 and /191 by controlling the switches D and /D. For example, when the switch D is turned on, the current Idr on line 191 pulls down the voltage at the node N1 of the input device 184 in a TMDS receiver 18' through the terminal impedance RT of about 50Ω. The other line /191, which carries no current at this time, is maintained at Avcc (3.3V), thus a differential voltage swing is achieved.

Currently, separate LVDS and TMDS transmitters in different chips are required for transmitting LVDS signals and TMDS signals.

SUMMARY

An embodiment of the invention thus provides a combined output driver capable of transmitting LVDS signals and TMDS signals. In the combined output driver, a first output driver outputs a first differential signal to a first external input unit through a pair of output signal lines according to first input signals in a first mode, and a second output driver outputs a second differential signal to a second external input unit through the pair of output signal lines according to second input signals in a second mode. The first output driver comprises a first current source coupled between a first power voltage and a first node, a first differential unit generating the first differential according to the first input signals and comprising two power terminals and a first clamping device coupled between the first node and the first differential unit to clamp potentials at the two power terminals less than a second power voltage. The second output driver comprises a second differential unit generating the second differential signal according to the second input signals and a second clamping device coupled between the pair of output signal lines and the second differential unit to clamp potentials at the two output terminals of the second differential unit less than the second power voltage.

BRIEF DESCRIPTION OF THE DRAWINGS

Embodiment of the invention can be more fully understood by the subsequent detailed description and examples with reference made to the accompanying drawings, wherein.

DETAILED DESCRIPTION

First Embodiment

Figure 3A:
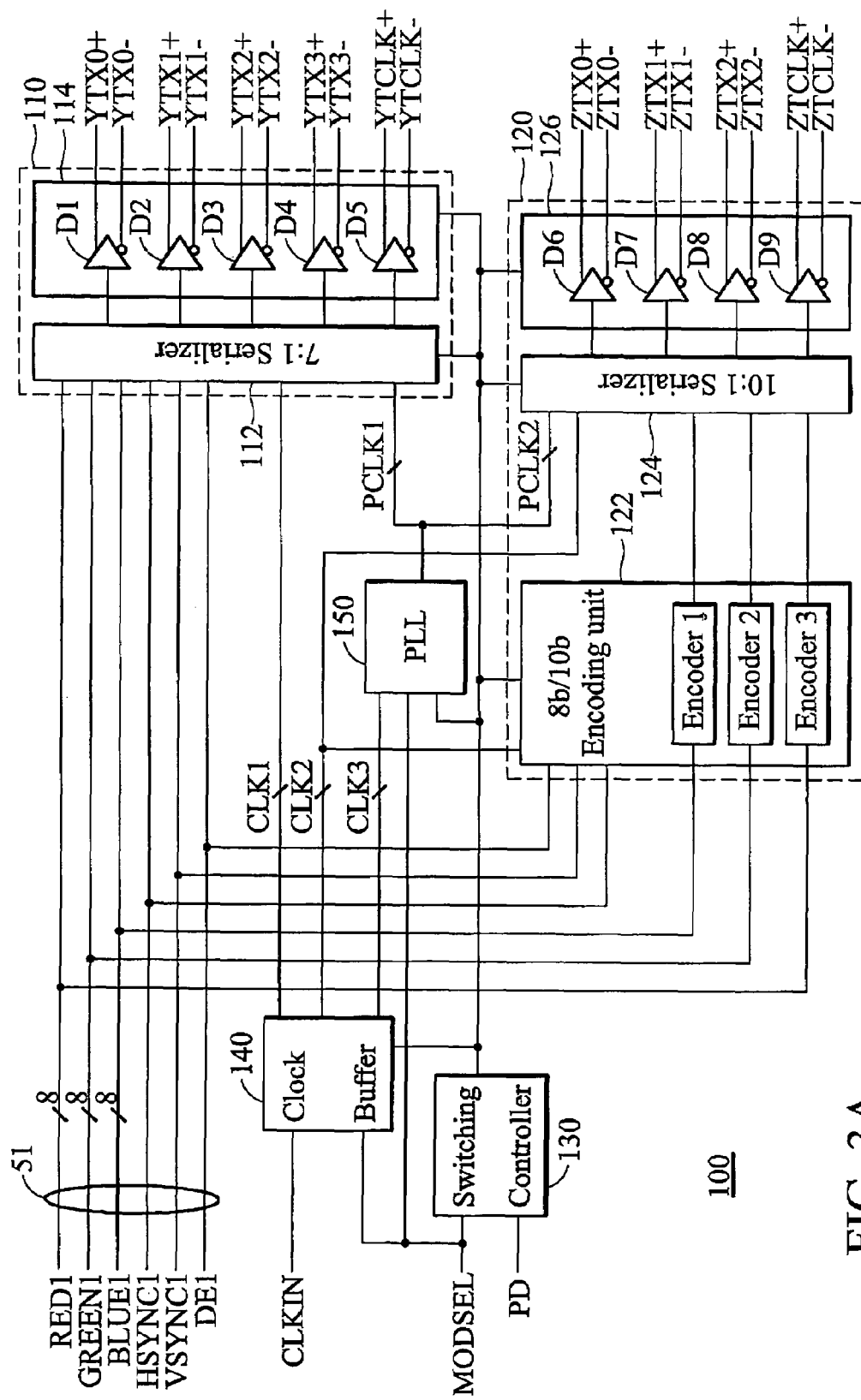
FIG. 3A shows a combined transmission unit according to a first embodiment of the invention.

FIG. 3A is a schematic diagram of a combined transmitter capable of transmitting LVDS signals and TMDS signals according to a first embodiment of the invention. As shown in FIG. 3A, the combined transmitter 100 comprises a first set of input terminals 51, a first transmission unit 110, a second transmission unit 120, a switching controller 130, a clock buffer 140 and a phase locked loop (PLL) 150. The set of input terminal 51 receives first data comprising video and sync information (RED1, GREEN1, BULE1, HSYNC1, VSYNC1 and DE1).

Figure 1A:
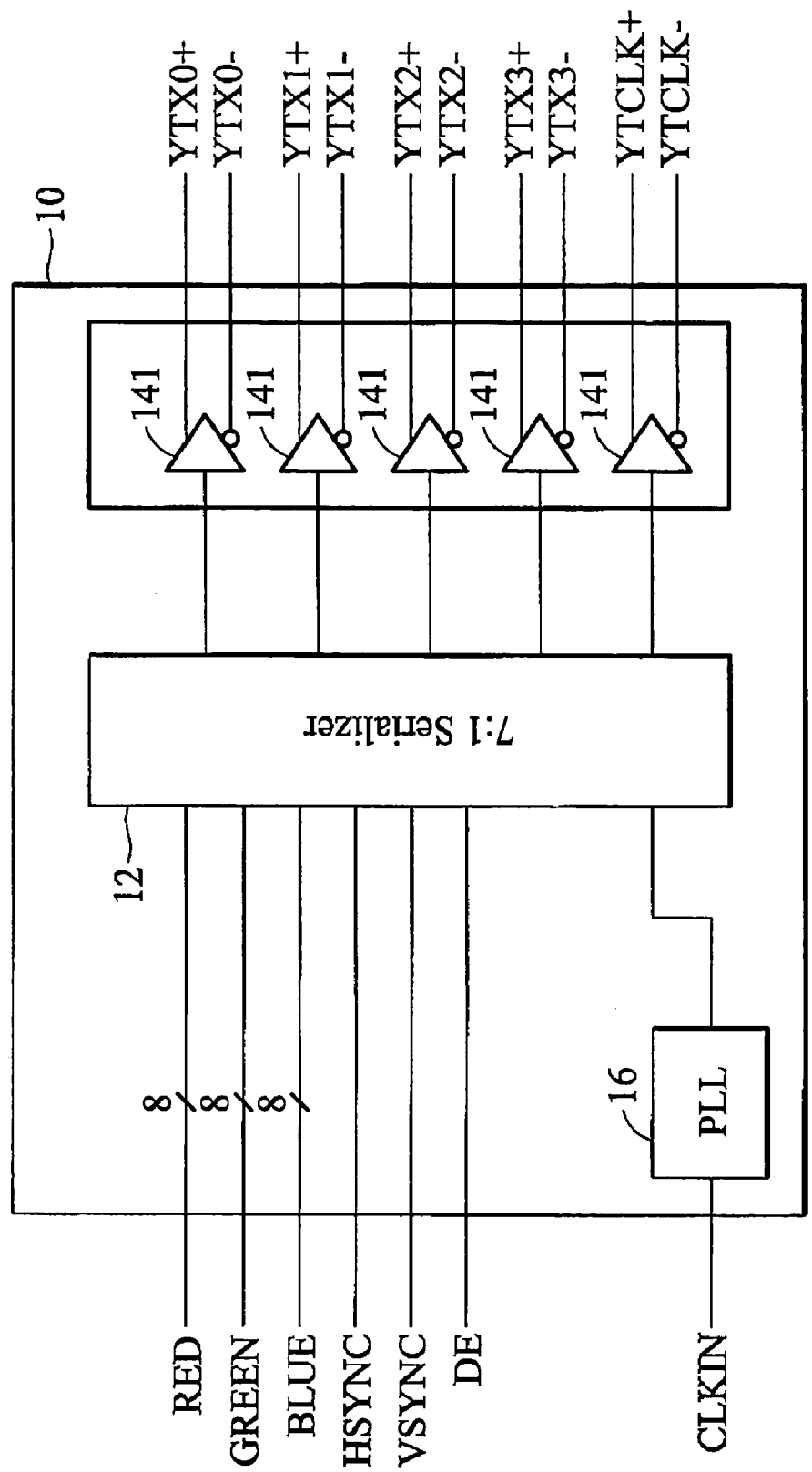
FIG. 1A shows a conventional LVDS transmitter.
Figure 1B:
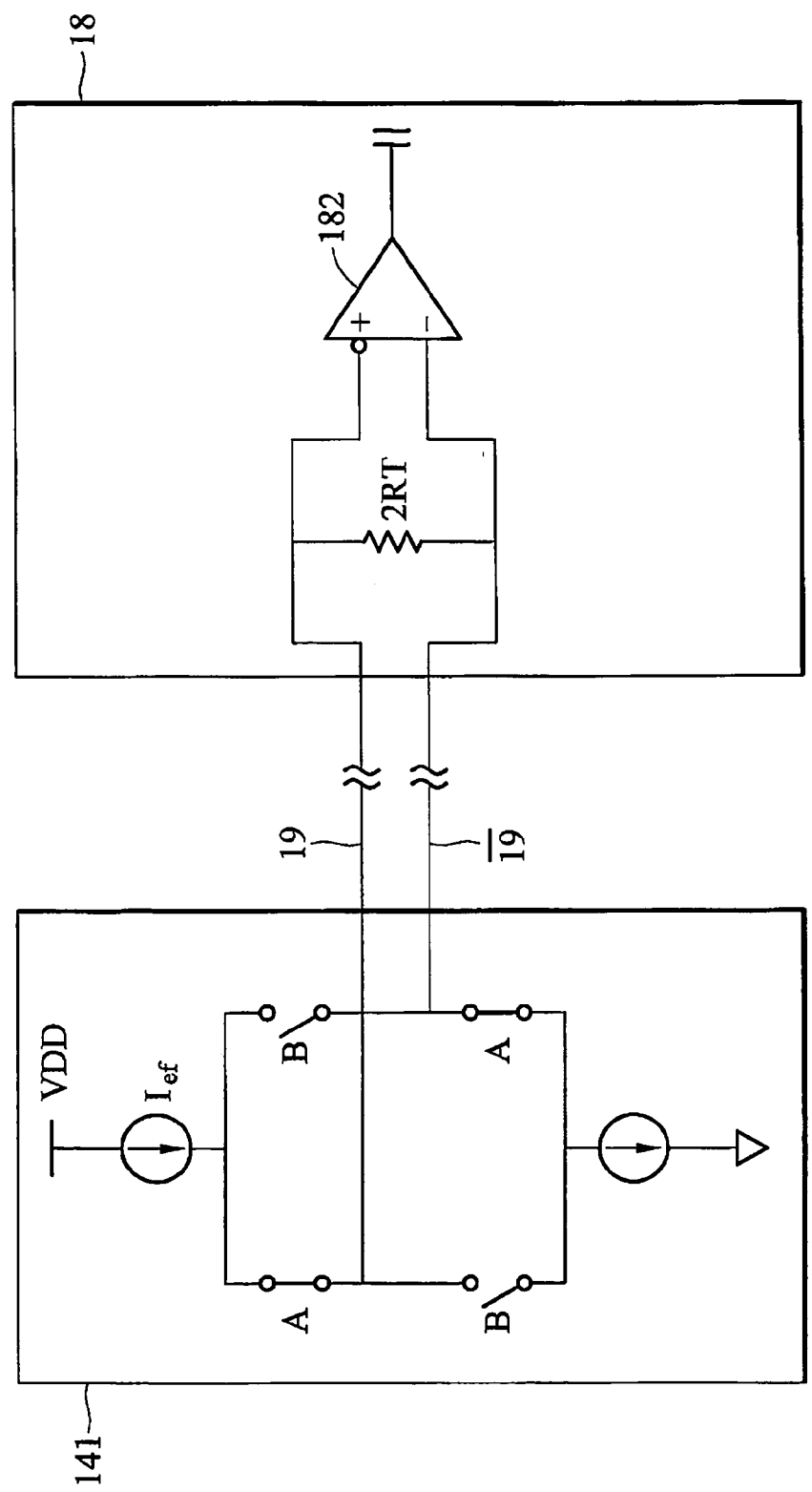
FIG. 1B is a diagram showing an output driver in LVDS transmitter and a corresponding input unit thereof.

In this embodiment, the first transmission unit 110 can be a LVDS transmitter as shown in FIGS. 1A and 1B. The first transmission unit 110 is coupled to the input terminals 51 to transmit first data, through the first signal lines YTX0+ ~YTX3+, YTX0-~YTX3-, YTCLK+ and YTCLK-, to a corresponding receiver (not shown). The first transmission unit 110 comprises a first serializer 112 coupled to the input terminals 51 to convert parallel data to serial data streams and a driving unit 114 coupled to the first serializer 112 to transmit the serial data streams to a corresponding receiver. The driving unit 114 has a plurality of first drivers D1~D5, which can be LVDS drivers. Each first drivers D1~D5 is capable sending a first differential signal to a first external input unit of a corresponding receiver through a pair of first signal lines. Each first external input unit in the corresponding receiver has a first resistor coupled between the first signal lines. For example, the driver D1 can send differential signals continuously to a corresponding input unit of an external receiver through the pair of signal lines YTX0+ and YTX0-, and so on.

Figure 2A:
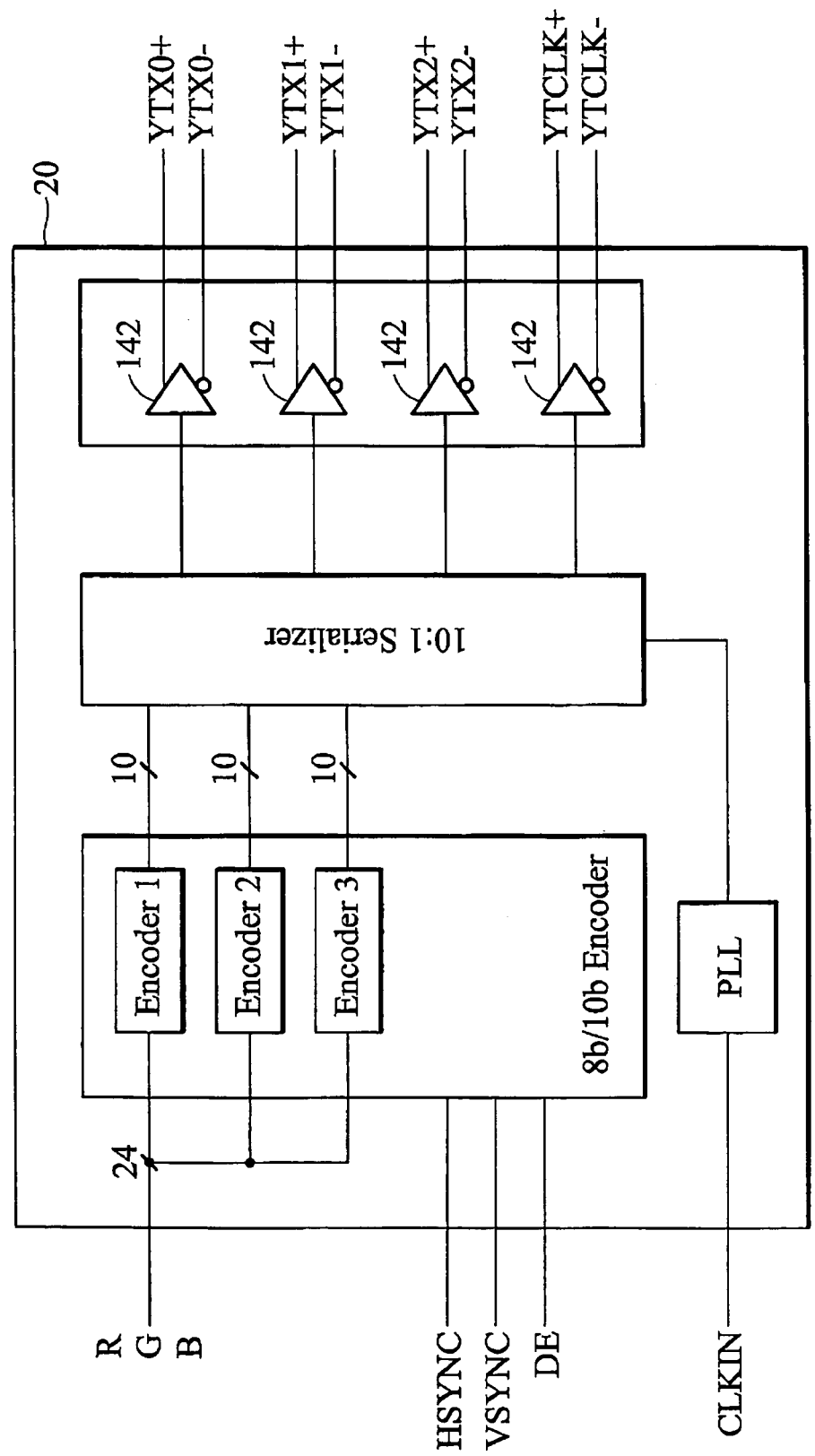
FIG. 2A shows a conventional TMDS transmitter.
Figure 2B:
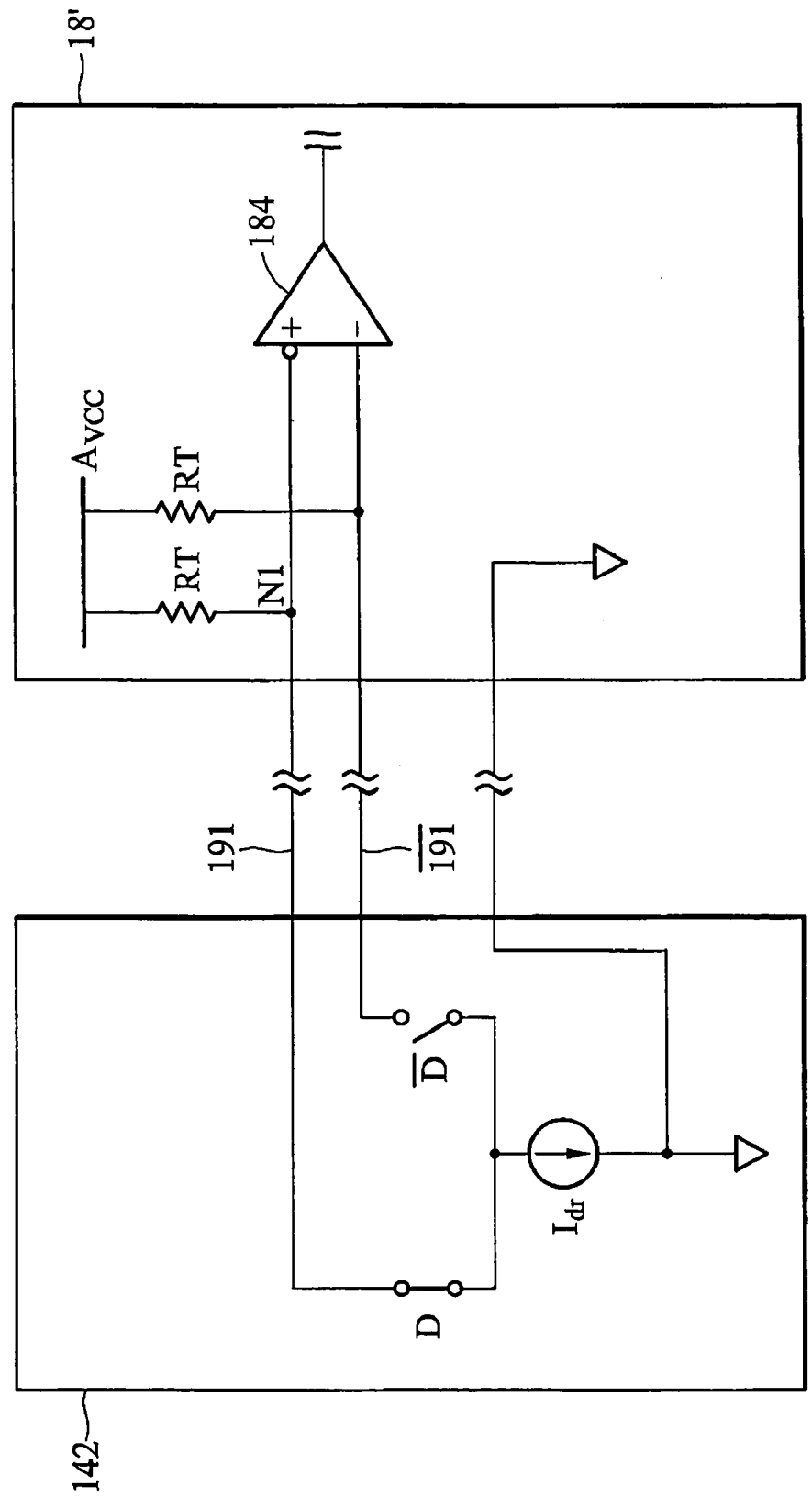
FIG. 2B is a diagram showing an output driver in TMDS transmitter and a corresponding input unit thereof.

In this embodiment, the second transmission unit 120 can be a TMDS transmitter as shown in FIGS. 2A and 2B. The second transmission unit 120 is coupled to the input terminals 51 to transmit the first data, through the second signal lines (ZTX0+~ZTX2+, ZTX0-~ZTX2-, ZTCLK+~ZTCLK-) to a corresponding receiver. The second transmission unit 120 comprises an encoding unit 122, a second serializer 124 and a driving unit 126. The encoding unit 122 is coupled to the input terminals 51 to encode the first data to second data. In this embodiment, the encoding unit 122 can be a 8 bit/10 bit encoding unit comprising three encoders to encode the first data to the second data. In the 8 bit/10 bit encoding unit, each 8 bits of data is encoded to 10 bits of data. The second serializer 124 is coupled to the encoding unit 122 to convert parallel data to serial data streams, and the driving unit 126 transmits the serial data streams from the serializer to a corresponding receiver.

The driving unit 126 has a plurality of second drivers D6~D9, which can be TMDS drivers. Each second drivers D6~D9 is capable sending a second differential signal to a second external input unit through a pair of second signal lines. The second external input unit in the receiver has second resistors each coupled between a power rail in the second external input unit and one of the second signal lines. For example, the driver D6 can send differential signals continuously to a corresponding input unit of an external receiver through the pair of signal lines ZTX0+ and ZTX0-, and so on.

The switching controller 130 is coupled to the first transmission unit 110, the second transmission unit 120, the clock buffer 140 and the PLL 150. The switching controller 130 enables or disables the first transmission unit 110, the second transmission unit 120, the clock buffer 140 and the PLL 150 in different operation modes according to a mode selection signal MODSEL and a power down selection signal PD. The clock buffer 140 is coupled to an input clock CLKIN, the mode selection signal MODSEL and the switching controller 130, to generate internal clock signals CLK1~CLK3 for the first transmission unit 110, the second transmission unit 120 and the PLL 150 respectively.

Figure 4:
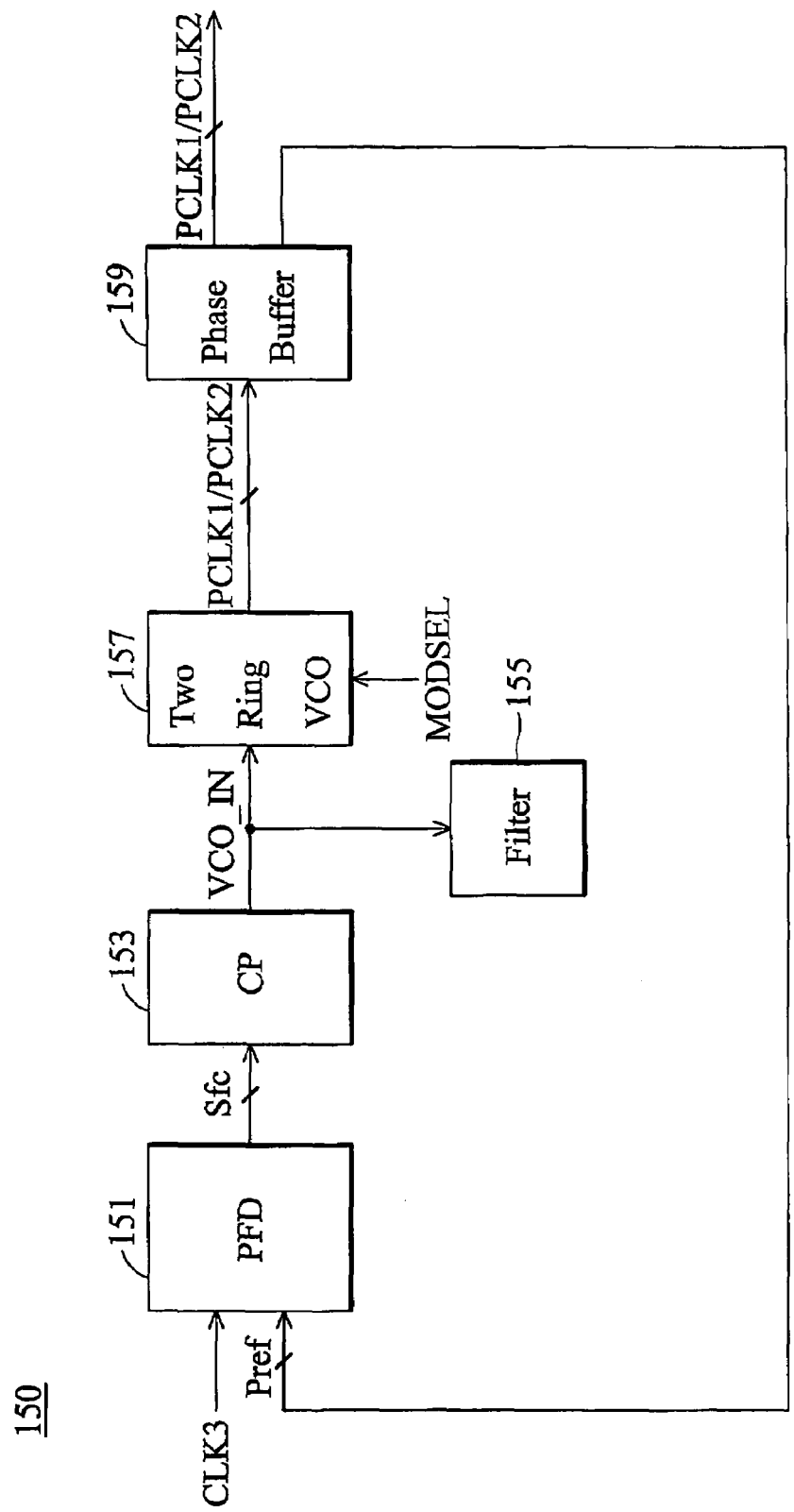
FIG. 4 is a block diagram of a phase locked loop in the combined transmission unit according to embodiments of the invention.

The PLL 150 is coupled to the third clock signal CLK3 and the mode selection signal MODSEL to generate a first set of output clock signals PCLK1 to the first transmission unit 110 in LVDS mode and a second set of output clock signals PCLK2 to the second transmission unit 120 in TMDS mode. FIG. 4 shows a phase locked loop 150 according to embodiments of the invention, wherein the third clock signal can be identical to the input clock CLKIN.

As shown in FIG. 4, the PLL 150 comprises a phase frequency detector (PFD) 151, a charge pump 153, a low pass filter 155, a two-ring voltage controlled oscillator (VCO) 157 and a phase buffer.

The PFD 151 is coupled to clock buffer 140 to compare the third clock signal CLK3 with a feedback clock signal Pref and generate an error signal Sfc proportional to the phase/frequency difference between the third clock signal CLK3 and a feedback clock signal Pref. The error signal Sfc is output to the charge pump 153. The charge pump 153 is coupled to the error signal Sfc from the PFD 151 to generate a charge control signal VCOIN by the low pass filter 155. Typically, the charge pump 153 can be charged or discharged by the error signal Sfc from the PFD 151 to output a current signal, and the filter 155 is coupled to the charge pump 153 to convert the current signal to the charge control signal VCOIN.

The two-ring VCO 159 is coupled to the charge control signal VCOIN and the mode selection signal MODSEL to generate the first set of output clock signals PCLK1 in the LCDS mode and the second set of output clock signals PCLK2 in TMDS mode. The optional phase buffer 159 is coupled to the two-ring VCO 157 to store the first set of clock signals PCLK1 or the second set of clock signals PCLK2 from the two-ring VCO 157. In embodiments of the invention, one of the first clock signals PCLK1 is output to the PFD serving as the feedback clock signal Pref in LVDS mode, and one of the second clock signals PCLK2 is output to the PFD serving as the feedback clock signal Pref in TMDS mode.

Figure 5:
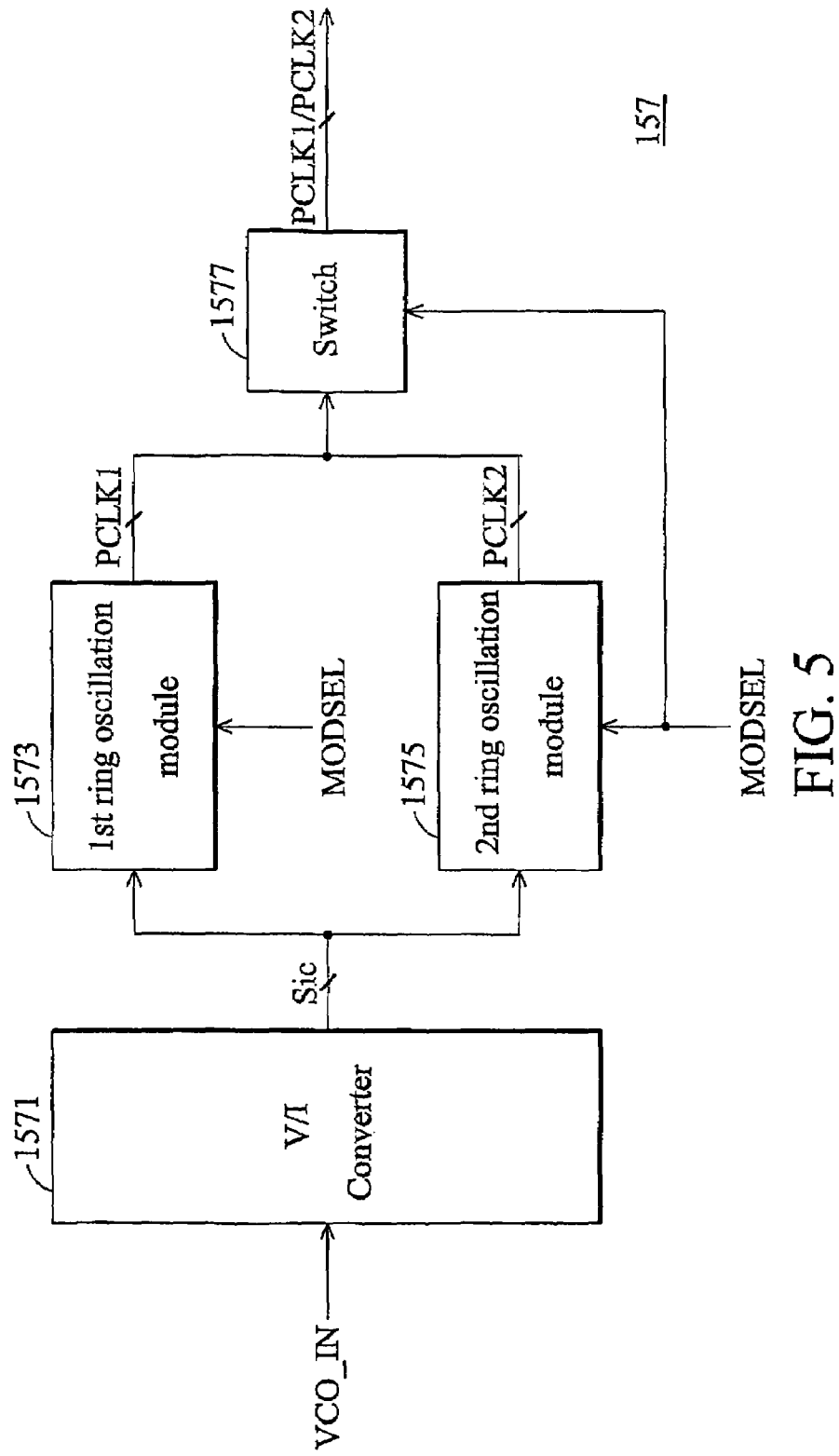
FIG. 5 is a block diagram of a two-ring voltage control oscillator in the phase locked loop according to embodiments of the invention.

FIG. 5 shows a two-ring VCO 157 in the phase locked loop 150 according to embodiments of the invention. As shown in FIG. 5, the two-ring VCO 157 comprises a voltage-to-current converter 1571, a first ring oscillation module 1573, a second ring oscillation module 1575 and a switch 1577.

The converter 1571 is coupled to the charge pump 153 and the low pass filter 155 to convert charge control signal to a current control signal Sic. The first ring oscillation module 1573 is enabled to generate the first set of output clock signals PCLK1 in the LVDS mode according to the current control signal Sic and the mode selection signal MODSEL. In embodiments of the invention, the first ring oscillation module 1573 can be a 7-stage ring oscillator comprising seven delay cells connected in a loop. In LVDS mode, the first ring oscillation module 1573 is enabled to generate 14 clock signals with different phase as the first set of output clock signals PCLK1 for the first serializer 112 of the first transmission unit 110.

The second ring oscillation module 1575 is enabled to generate the second set of output clock signals PCLK2 in TMDS mode according to the current control signal Sic and the mode selection signal MODSEL. In embodiments of the invention, the second ring oscillation module 1575 can be a 5-stage ring oscillator comprising five delay cells connected in a loop. In TMDS mode, the second ring oscillation module 1575 is enabled to generate 10 clock signals with different phase as the second set of output clock signals PCLK2 for the second serializer 124 of the second transmission unit 120. The switch 1577 is coupled to the first and second ring oscillation module 1573 and 1575 to output the first set of output clock signals PCLK1 in LVDS mode or the second set of output clock signals PCLK2 in TMDS mode according to mode selection signal MODSEL.

Operations of the combined transmitter 100 according to the first embodiment of the invention are described as follows, with reference to FIG. 3A.

In LVDS mode (first mode), the mode selection signal MODSEL and the power selection signal PD are high and low respectively, such that the switching controller 130 disables the second transmitter 120 and enables the first transmission unit 110 to transmit the first data on the first terminals 51 to a corresponding external receiver. The clock buffer 140, according to the input clock CLKIN and the mode selection signal MODSEL, generates the first clock signal CLK1 and the third clock signal CLK3 to the first transmission unit 110 and the PLL respectively. The PLL 150, according to the third clock signal CLK3 and the mode selection signal MODSEL, generates the first set of output clock signals PCLK1 to the first transmission unit 110.

The first serializer 112 converts first data on the input terminals 51 and the first set output clock signal PCLK1 to serial data streams, and the driving unit 114 transmits the serial data streams to a corresponding external receiver through signal lines YTX0+~YTX3+, YTX0-~YTX3-, YTCLK+ and YTCLK-. In this mode, according to the mode selection signal MODSEL and the power selection signal PD, the second clock CLK2 and the second set output clock signal PCLK2 for the second transmission unit 120 are disabled, such that the encoding unit 122, the second serializer 124 and driving unit 126 in the second transmission 120 are disabled.

In TMDS mode (second mode), the mode selection signal MODSEL and the power selection signal PD are both low, such that the switching controller 130 disables the first transmitter 110 and enables the first transmission unit 120 to transmit the first data on the first terminals 51 to a corresponding external receiver. The clock buffer 140, according to the input clock CLKIN and the mode selection signal MODSEL, generates the second clock signal CLK2 and the third clock signal CLK3 to the second transmission unit 120 and the PLL respectively. The PLL 150, according to the third clock signal CLK3 and the mode selection signal MODSEL, generates the second set of output clock signals PCLK2 to the second transmission unit 120. The encoding unit 122 encodes the first data on the first input terminals 51 to second data, the second serializer 124 converts the second data and the second set of output clock signal PCLK2 to serial data streams, and the driving unit 126 transmits the serial data streams to a corresponding external receiver through the second signal lines ZTX0+~ZTX2+, ZTX0-~ZTX2-, ZTCLK+~ZTCLK-. In this mode, according to the mode selection signal MODSEL and the power selection signal PD, the first clock CLK1 and the first set of output clock signals PCLK1 for the first transmission unit 110 are disabled, such that the first serializer 112 and driving unit 124 in the first transmission 110 are disabled.

In the power down mode, the power selection signal PD is high, and the switching controller 130 powers down the first transmission unit 110, the second transmission unit 120, the clock buffer 140 and the PLL 150, regardless of the state of the mode selection signal MODSEL. Thus, the combined transmitter of the embodiment can transmit LVDS signals in LVDS mode and TMDS signals in TMDS mode by the mode selection signal. In this first embodiment, the first and second transmission units 110 and 120 share the first input terminals 51.

Second Embodiment

Figure 3B:
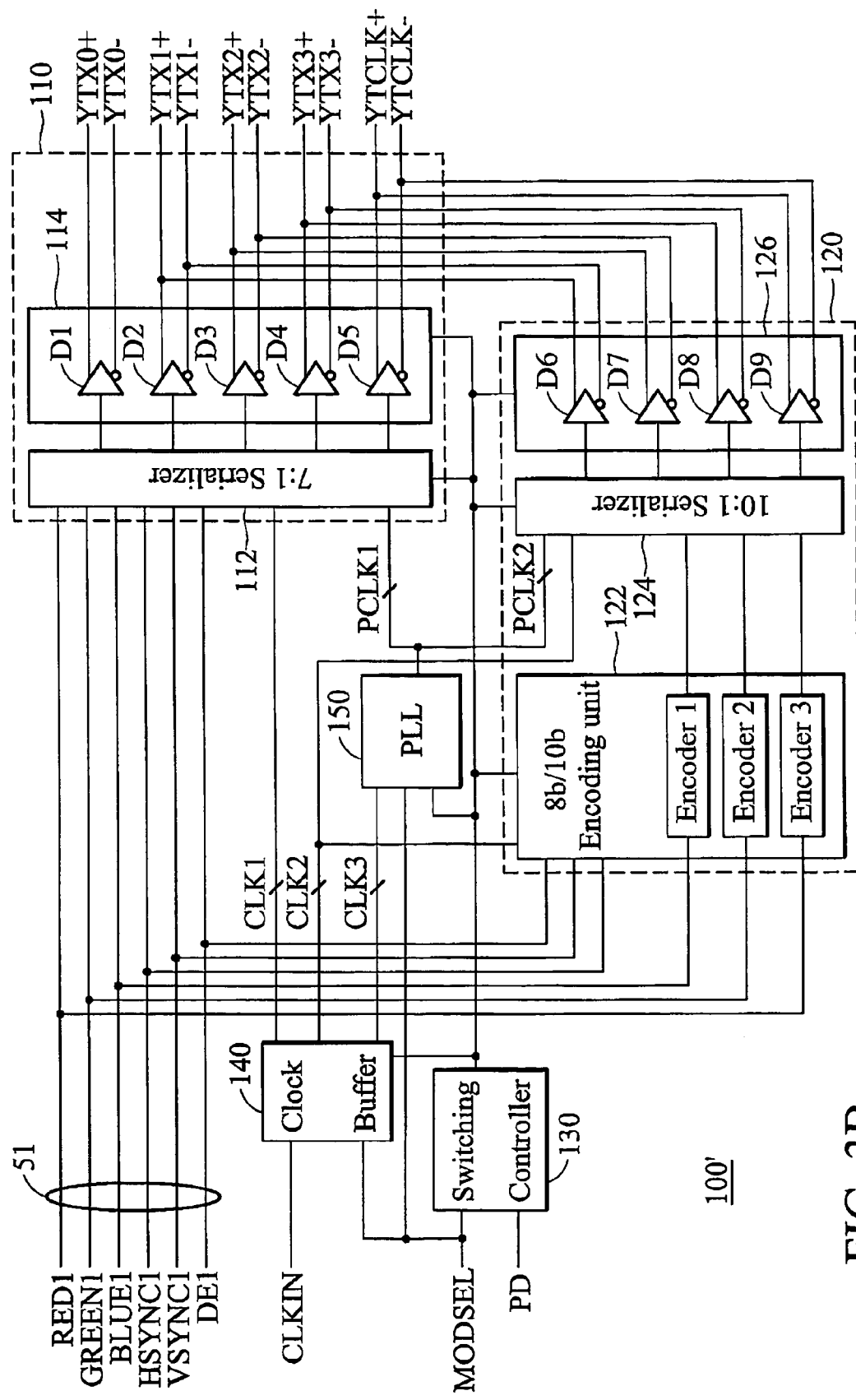
FIG. 3B shows a combined transmission unit according to a second embodiment of the invention.

FIG. 3B is a schematic diagram of a combined transmitter capable of transmitting LVDS signals and TMDS signals according to a second embodiment of the invention. As shown in FIG. 3B, the combined transmitter 100' comprises a first set of input terminals 51, a first transmitter 110, a second transmitter 120, a switching controller 130, a clock buffer 140 and a phase locked loop (PLL) 150.

The combined transmitter 100' is similar to that shown in FIG. 3A except for the driving unit 126. For brevity, description of like structures is omitted. In this embodiment, the drivers D6~D9 are coupled to the signal lines YTX1+ ~YTX3+, YTX1-~YTX3-, YTCLK+ and YTCLK- coupled to the driving unit 114 in the first transmission unit 110, rather than the signal lines ZTX0+~ZTX2+, ZTX0- ~ZTX2-, ZTCLK+~ZTCLK- as shown in FIG. 3A. In this embodiment, the first and second transmission units 110 and 120 share the input terminals 51 and the output terminals, such as the signal lines YTX1+~YTX3+, YTX1-~YTX3-, YTCLK+~YTCLK-.

In LVDS mode (first mode), the mode selection signal MODSEL and the power selection signal PD are high and low respectively, such that the switching controller 130 disables the second transmitter 120 and enables the first transmission unit 110 to transmit the first data on the first terminals 51 to a corresponding external receiver. The clock buffer 140, according to the input clock CLKIN and the mode selection signal MODSEL, generates the first clock signal CLK1 and the third clock signal CLK3 to the first transmission unit 110 and the PLL respectively. The PLL 150, according to the third clock signal CLK3 and the mode selection signal MODSEL, generates the first set of output clock signal PCLK1 to the first transmission unit 110.

The first serializer 112 converts first data on the input terminals 51 and the first set output clock signals PCLK1 to serial data streams, and the driving unit 114 transmits the serial data streams to a corresponding external receiver through signal lines YTX0+~YTX3+, YTX0-~YTX3-, YTCLK+ and YTCLK-. In this mode, according to the mode selection signal MODSEL and the power selection signal PD, the second clock CLK2 and the second set output clock signals PCLK2 for the second transmission unit 120 are disabled, such that the encoding unit 122, the second serializer 124 and driving unit 126 in the second transmission 120 are all disabled.

In TMDS mode (second mode), the mode selection signal MODSEL and the power selection signal PD are both low respectively, such that the switching controller 130 disables the first transmitter 110 and enables the first transmission unit 120 to transmit the first data on the first terminals 51 to a corresponding external receiver (not shown). The clock buffer 140, according to the input clock CLKIN and the mode selection signal MODSEL, generates the second clock signal CLK2 and the third clock signal CLK3 to the second transmission unit 120 and the PLL respectively. The PLL 150, according to the third clock signal CLK3 and the mode selection signal MODSEL, generates the second set of output clock signals PCLK2 to the second transmission unit 120. The encoding unit 122 encodes the first data on the second input terminals 52 to second data, the second serializer 124 converts the second data and the second set of output clock signals PCLK2 to serial data streams, and the driving unit 126 transmits the serial data streams to a corresponding external receiver through the first signal lines YTX1+~YTX3+, YTX1-~YTX3-, YTCLK+~YTCLK-. In this mode, according to the mode selection signal MODSEL and the power selection signal PD, the first clock CLK1 and the first set of output clock signals PCLK1 for the first transmission unit 110 are disabled, such that the first serializer 112 and driving unit 124 in the first transmission 110 are disabled.

In the power down mode, the power selection signal PD is high, and the switching controller 130 powers down the first transmission unit 110, the second transmission unit 120, the clock buffer 140 and the PLL 150, regardless of the state of the mode selection signal MODSEL. Thus, the combined transmitter of the embodiment can transmit LVDS signals in LVDS mode and TMDS signals in TMDS mode by the mode selection signal.

Third Embodiment

Figure 3C:
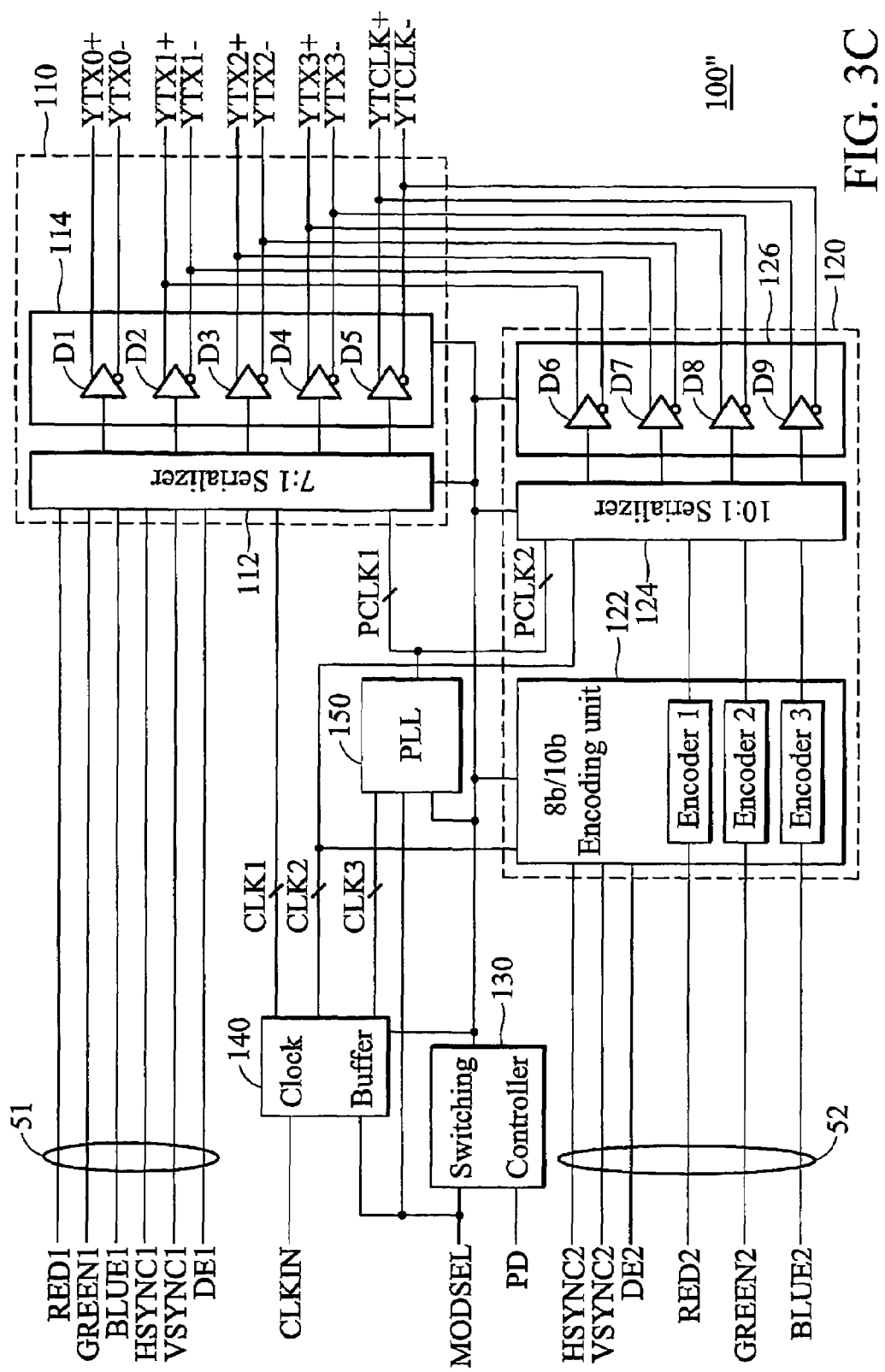
FIG. 3C shows a combined transmission unit according to a third embodiment of the invention.

FIG. 3C is a schematic diagram of a combined transmitter capable of transmitting LVDS signals and TMDS signals according to a third embodiment of the invention. As shown in FIG. 3C, the combined transmitter 100" comprises a first set of input terminals 51, a second set of input terminals 52, a first transmitter 110, a second transmitter 120, a switching controller 130, a clock buffer 140 and a phase locked loop (PLL) 150.

The combined transmitter 100" is similar to that in FIG. 3A except for the encoding unit 122 and the driving unit 126. For brevity, description of like structures is omitted. In this embodiment, the second set of input terminals 52 receives second data comprising video and sync information RED2, GREEN2, BULE2, HSYNC2, VSYNC2 and DE2. The encoding unit 122 in second transmission unit 120 is coupled to the second set input terminals 52, rather than the first set of input terminals 51 as shown in FIG. 3A. Further, the drivers D6~D9 in the second driving unit 126 are coupled to the signal lines YTX1+~YTX3+, YTX1-~YTX3-, YTCLK+ and YTCLK- coupled to the driving unit 114 in the first transmission unit 110, rather than the signal lines ZTX0+~ZTX2+, ZTX0-~ZTX2-, ZTCLK+~ZTCLK- as shown in FIG. 3A. In this embodiment, the first and second transmission units 110 and 120 share as the output terminals, such as the signal lines YTX1+~YTX3+, YTX1-~YTX3-, YTCLK+~YTCLK-.

In LVDS mode (first mode), the mode selection signal MODSEL and the power selection signal PD are high and low respectively, such that the switching controller 130 disables the second transmitter 120 and enables the first transmission unit 110 to transmit the first data on the first terminals 51 to a corresponding external receiver. The clock buffer 140, according to the input clock CLKIN and the mode selection signal MODSEL, generates the first clock signal CLK1 and the third clock signal CLK3 to the first transmission unit 110 and the PLL respectively. The PLL 150, according to the third clock signal CLK3 and the mode selection signal MODSEL, generates the first set of output clock signals PCLK1 to the first transmission unit 110.

The first serializer 112 converts first data on the input terminals 51 and the first set output clock signal PCLK1 to serial data streams, and the driving unit 114 transmits the serial data streams to a corresponding external receiver through signal lines YTX0+~YTX3+, YTX0-~YTX3-, YTCLK+ and YTCLK-. In this mode, according to the mode selection signal MODSEL and the power selection signal PD, the second clock CLK2 and the second set output clock signals PCLK2 for the second transmission unit 120 are disabled, such that the encoding unit 122, the second serializer 124 and driving unit 126 in the second transmission 120 are all disabled.

In TMDS mode (second mode), the mode selection signal MODSEL and the power selection signal PD are both low respectively, such that the switching controller 130 disables the first transmitter 110 and enables the first transmission unit 120 to transmit the second data on the second terminals 52 to a corresponding external receiver (not shown). The clock buffer 140, according to the input clock CLKIN and the mode selection signal MODSEL, generates the second clock signal CLK2 and the third clock signal CLK3 to the second transmission unit 120 and the PLL respectively. The PLL 150, according to the third clock signal CLK3 and the mode selection signal MODSEL, generates the second set of output clock signals PCLK2 to the second transmission unit 120. The encoding unit 122 encodes the second data on the second input terminals 52 to third data, the second serializer 124 converts the third data and the second set of output clock signal PCLK2 to serial data streams, and the driving unit 126 transmits the serial data streams to a corresponding external receiver through the first signal lines YTX1+~YTX3+, YTX1-~YTX3-, YTCLK+~YTCLK-. In this mode, according to the mode selection signal MODSEL and the power selection signal PD, the first clock CLK1 and the first set output clock signal PCLK1 for the first transmission unit 110 are disabled, such that the first serializer 112 and driving unit 124 in the first transmission 110 are disabled.

In the power down mode, the power selection signal PD is high, and the switching controller 130 powers down the first transmission unit 110, the second transmission unit 120, the clock buffer 140 and the PLL 150, regardless of the state of the mode selection signal MODSEL. Thus, the combined transmitter of the embodiment can transmit LVDS signals in LVDS mode and TMDS signals in TMDS mode by the mode selection signal.

There are differences between output drivers in the LVDS transmission unit and output drivers in the TMDS transmission unit. For example, no reference voltage is required at corresponding receivers for output drivers in the LVDS transmission unit, and the common mode voltage (Vcm) determined by the LVDS transmission unit is typically 1.25V. A stable reference voltage Avcc is required at corresponding receivers for output drivers in the TMDS transmission unit, the stable reference voltage Avcc is typically 3.3V and the common mode voltage is 3V. Moreover, the output differential voltage swing of the output drivers in the LVDS transmission unit is from 250 mV to 450 mV around common mode voltage Vcm. The output differential voltage swing of the output drivers in the LVDS transmission unit is from 400 mV to 600 mV. Different common mode voltages, however, generate incompatibility when the LVDS and TMDS transmission units directly share the output terminals without modifying structures of the LVDS and TMDS output drivers. This problem is described as follows.

Figure 6:
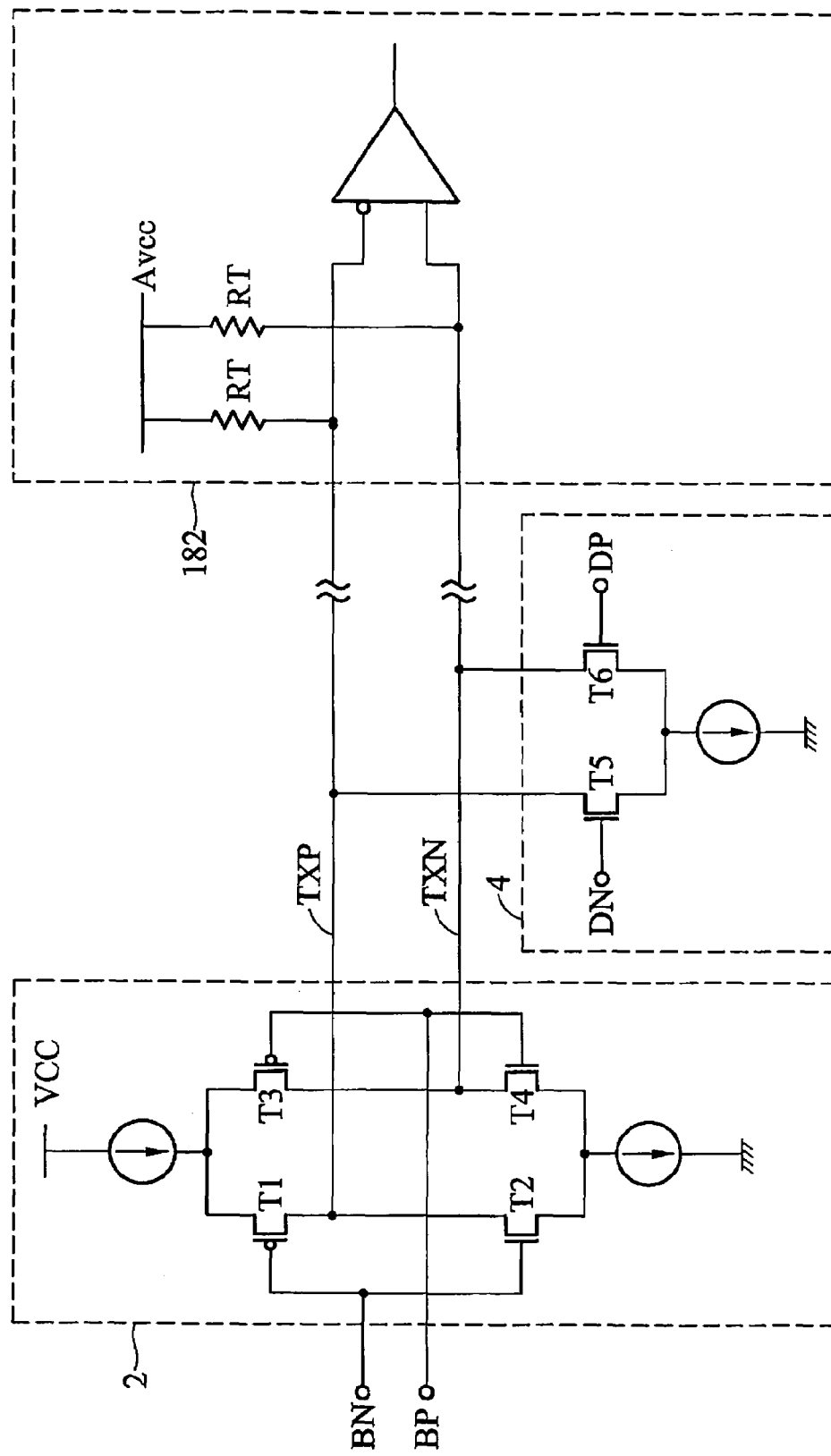
FIG. 6 shows a unique combination of an LVDS driver and a TMDS driver sharing a pair of output terminals.

FIG. 6 shows a unique combination of an LVDS driver and a TMDS driver share a pair of output terminals. As shown, the power source VCC in the LVDS driver 2 is typically 2.5V. The common mode voltage Avcc in input unit 182 of the external receiver is typically 3V. In TMDS mode, the LVDS driver 2 is disabled and the TMDS driver 4 enabled, signals BP and BN are both high (2.5V), and one of the signal lines TXP and TXN is pulled down to 2.7V from 3.3V according to the signals DN and DP. The voltages on the signal lines TXP and TXN, however, are higher than those on terminals BN and BP and power source VCC in the LVDS driver. Thus, leakage current may flow to the power source VCC in the LVDS driver 2 through the PMOS transistors T1 and T3, decreasing the output differential swing of the TMDS driver 4. Further, if MOS transistors T1~T6 are all 2.5V devices, device breakdown may occur due to the voltages on the signal lines TXP and TXN.

To address the problems caused by leakage current, embodiments of the invention provide a combined drive 200 for the combined transmitter sharing output terminals to transmit LVDS signals and TMDS signals, such as the combined transmitter 100' and 100" shown in FIGS. 3B and 3C.

Figure 7:
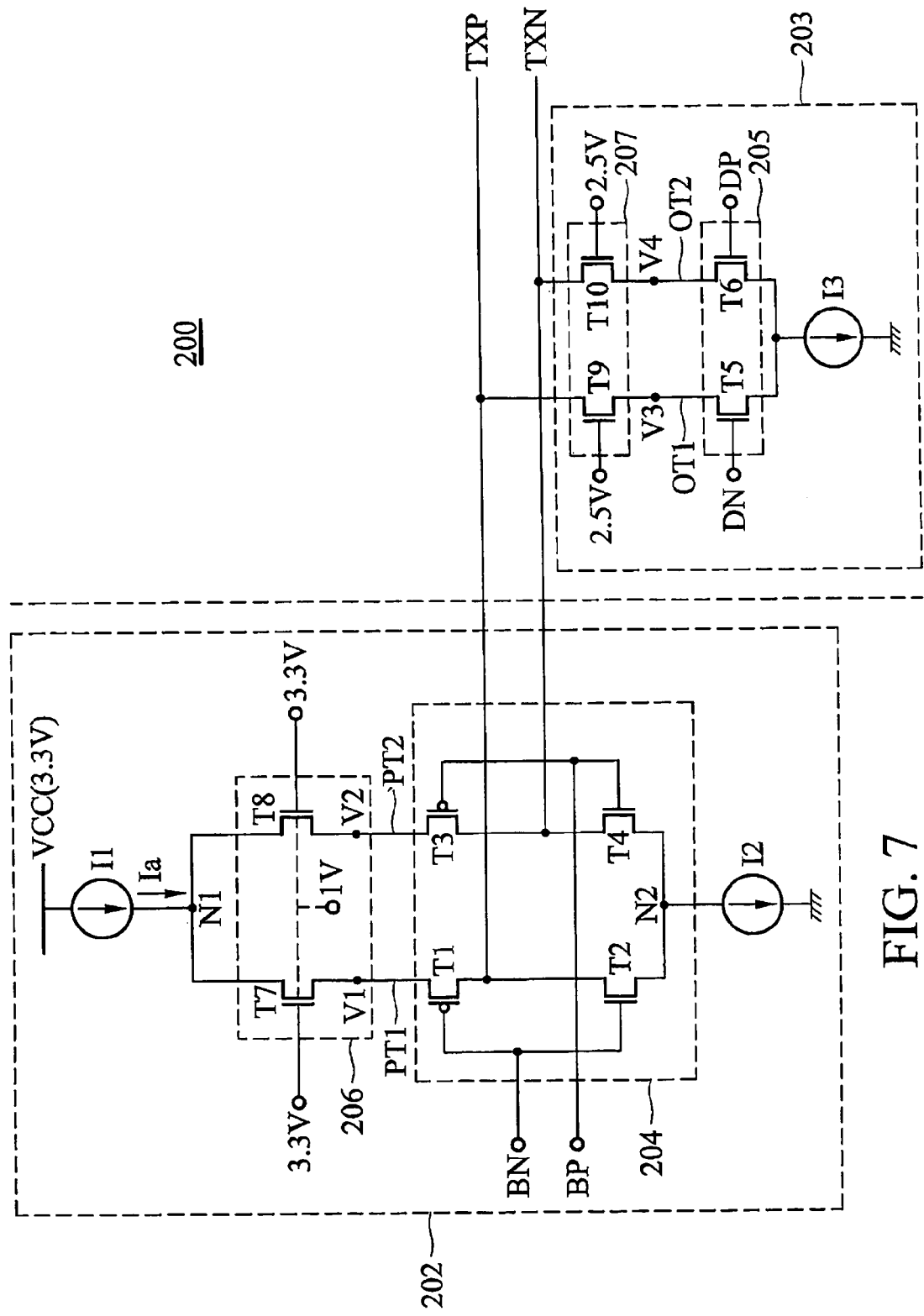
FIG. 7 shows a combined driver.

FIG. 7 shows one embodiment of a combined output driver for the combined transmitter transmitting LVDS signals and TMDS signals through shared output terminals. In embodiments of the invention, the second transmission unit is disabled by the switching controller, and the first transmission unit is enabled to transmit data to a corresponding receiver in LVDS mode. For example, the output drivers D6~D9 in the second transmission unit 120 can be disabled by control signals generated by the switching controller. In TMDS mode, the first transmission unit is disabled by the switching controller. For example, the output drivers D1~D5 in the first transmission unit 110 can be disabled by control signals generated by the switching controller.

As shown in FIG. 7, the combined output driver 200 comprises two output drivers 202 and 203. According to the embodiment of the combined output driver, the output buffer 203 shows the structure of each output driver (D1, D2, D3, D4 or D5) in the first transmission unit 110, and the output driver 202 shows the structure of each output driver (D6, D7, D8, or D9) in the second transmission unit 120. For example, the output driver 202, the signals lines TXP and TXN and the output driver 203 can be regarded as the output driver D6, the lines YTX1+0 and YTX– and output driver D2 as shown in FIGS. 3B and 3C respectively.

The output driver 202 is coupled to a pair of signal lines TXP and TXN to output a differential signal to a corresponding external input unit (not shown) through the signal lines TXP and TXN according to input signals BN and BP in LVDS mode. The output driver 202 comprises current sources I1 and I2, a differential unit 204 and a clamping device 206. Since the second transmission unit 110 is a LVDS transmission unit, the output driver 202 can be a LVDS driver.

The output driver 203 is able to output a differential signal to a corresponding external input unit (not shown) through signal lines TXP and TXN according to input signals DN and DP in TMDS mode. As shown in FIG. 7, the output driver 203 comprises a current source I3, a differential unit 205 and a clamping device 207. Since the second transmission unit 120 is a TMDS transmission unit, the output driver 203 can be a TMDS driver.

In LVDS mode, the first (LVDS) transmission unit 110 is able to transmit data and the second (TMDS) transmission unit 120 is disabled. Thus, the output drivers D1~D5 first (LVDS) in transmission unit 110 are enabled to output differential signals to corresponding external input units of a receiver, while all drivers D6~D9 in the second transmission unit 120 are disabled. As the output driver 202 represents the output drivers D1~D5 and the output driver 203 represents the drives D6~D9 in second transmission unit 120, the output driver 202 is enabled and the output driver 203 is disabled in LVDS mode.

Therefore, in the output driver 203, gates of the transistors T5 and T6 are pulled low and the current source I3 is disabled in LVDS mode. In the output driver 202, the output unit 204 generates a differential signal to a corresponding external input unit through the signal lines TXP and TXN according to the input signals BN and BP. For example, if the control signals BN and BP are low and high respectively, transistor T1 and T4 are turned on and transistors T2 and T3 are turned off, such that current Ia flows to the corresponding external input unit through the transistor T1, the signal line TXP and flows back through the signal line TXN, thereby creating a differential voltage at the input terminals of the corresponding external input unit, and vice versa.

In TMDS mode, the first (LVDS) transmission unit 110 is disabled and the second (TMDS) transmission unit 120 is enabled to transmit data. Thus, the output drivers D6~D9 in transmission unit 120 are able to output differential signals to corresponding external input units of a receiver, while all drivers D1~D5 in the first transmission unit 110 are disabled. As the output driver 203 represents the drives D6~D9 in second transmission unit 120 and the output driver 202 represents the output drivers D1~D5, the output driver 202 is disabled and the output driver 203 is enabled in TMDS mode.

Thus, the differential unit 204 in the output driver 202 is disabled according to the input signals BN and BP, such as a high voltage level of about 2.3V~2.5V, and current sources I1 and I2 are also disabled in TMDS mode. The output driver 203 outputs a differential signal to the corresponding external input unit of a receiver according to the input signals DN and DP. For example, if signals DP and DN are high and low, the signal line TXN is pulled down to 2.7 and the signal line TXP maintained at 3.3V, thereby creating a differential voltage at the input terminals of the corresponding external input unit, and vice versa.

Clamping device 206 clamps the voltages V1 and V2 at the power terminals of the differential unit 204 to below a predetermined level (second power voltage), and clamping device 207 clamps the voltages V3 and V4 on the output terminals of the differential unit 205 regardless of LVDS mode or TMDS mode. The predetermined level (second power voltage) can be 2.5V or lower. In clamping device 206, as control terminals of the transistor T7 and T8 are coupled to power voltage VCC of 3.3V and the substrates thereof coupled to 1V (fourth power voltage), the voltages V1 and V2 at the power terminals of the differential unit 204 can be clamped below 2.3V. In clamping device 207, as control terminals of the transistor T9 and T10 are coupled to voltage of 2.5V, the voltages V3 and V4 at the output terminals of the differential unit 205 can be clamped below 2.5V.

In LVDS mode, the clamping device 206 clamps the voltages V1 and V2 below a predetermined level a determined level (less than 3.3V -threshold voltage of the transistors T7 and T8, normally 2.3V, thereby preventing risk of device breakdown of the transistors T1 and T3 when the input signal BN or BP goes to zero in switching.

In TMDS mode, if the first clamping device 206 in the output driver 202 is omitted, the voltage level at the node 1 may stay at between 3.0V and 3.6V when the output driver 203 operates. Because the input signals BN and BP are both set at 2.3V in the TMDS mode, the transistors T1 and T3 may turn on and loop current leakage may occur between the transistors T1 and T2 and the signal lines TXN and TXP.

However, according to the embodiment, the voltages V1 and V2 in TMDS mode are clamped below about 2.3V by the clamping device 206 and input signals on control terminals of the transistors T1~T4 are also set at about 2.3V, the transistors T1~T4 are all turned off such that the loop leakage current through the transistors T3 and T4 caused by the voltages (2.7~3.3) on the signal lines TXP and TXN in TMDS mode is prevented. Consequently, there is no current leakage between signal lines TXP and TXN and transistors T1 and T3 in TMDS mode, and thus, the output differential swing of the output driver 203 is maintained.

Figure 8:
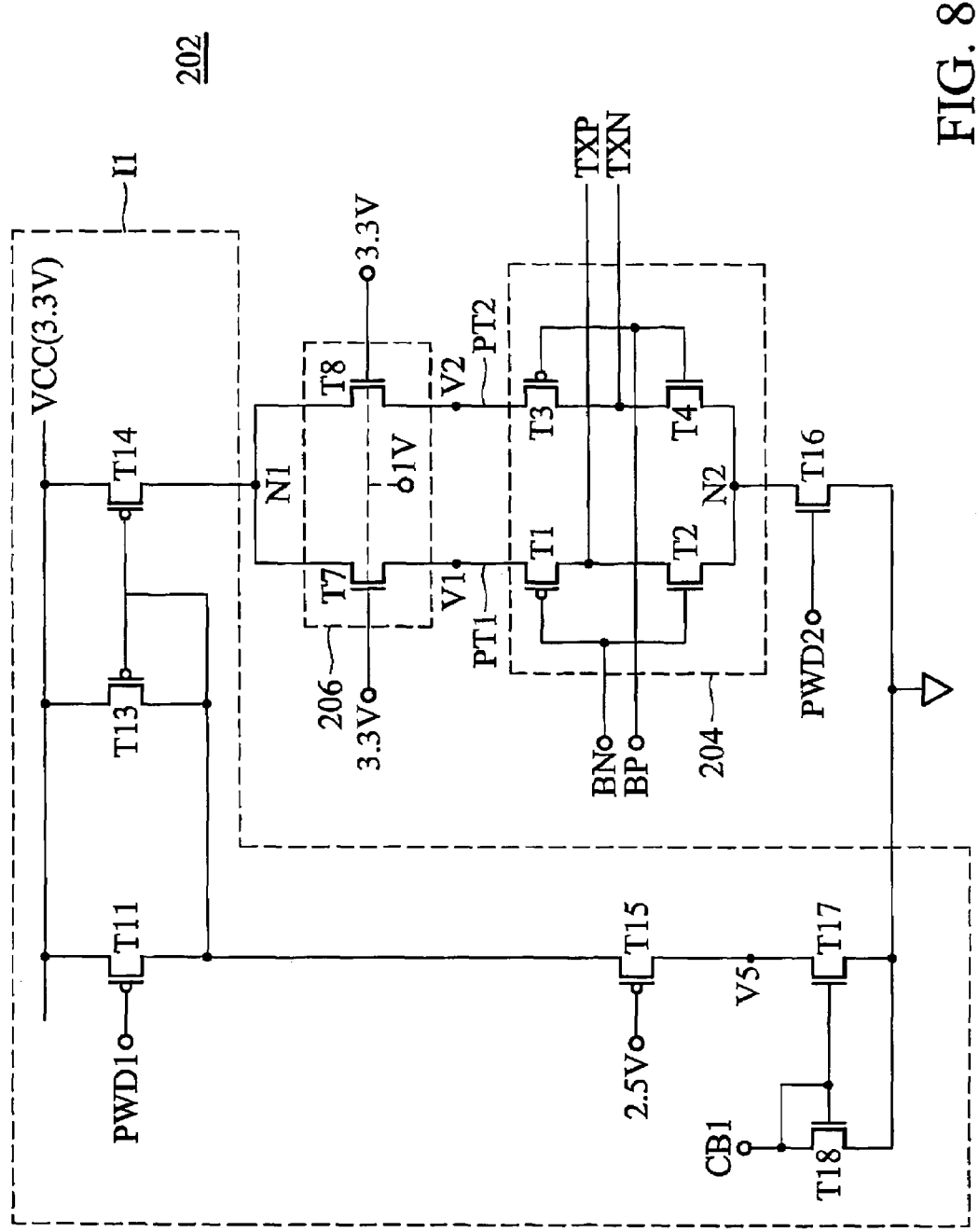
FIG. 8 shows a first output driver in the combined drive.

FIG. 8 shows output driver 202 of the combined output driver 200. As shown, the output driver 202 is able to output a differential signal to the external input unit of a receiver (not shown) through the signal lines TXP and TXN according to control signals from the driving buffer 204 in LVDS mode. The output driver 202 is coupled between the power voltage of 3.3V and the ground (third power voltage), and comprises two current sources I1 and I2, a differential unit 204 and a clamping device 206.

The current source I1 comprises transistors T11, T13, T14, T15, T17 and T18, and the current source I1 is controlled by a control signal PWD1. In TMDS mode or power down, the transistor T11 is turned on by the control signal PWD1 such that the source current I1 is disabled. The drain terminal of the transistors T18 and the control terminals of the transistors T17 and T18 are coupled to a bias current CB1. Further, the transistor T15 is coupled between the transistor T13 and T17 and serves as another clamping device for the current source I1. The transistor T15 comprises a control terminal coupled to a voltage of 2.5V, such that the voltage V5 on the drain of the transistor T17 can be clamed below 2.5V regardless of TMDS mode or LVDS mode.

In the differential unit 204, the control terminals of the transistors T1 and T2 are coupled to the input signal BN, and the control terminals of the transistors T3 and T4 are coupled to the input signal BP. The differential unit 204 generates a differential signal on the signal lines TXP and TXN according to the input signals BN and BP in LVDS mode, and is disabled by the input signals of high level of about 2.3V~2.5V in TMDS mode.

The clamping device 206 is coupled between the node N1 and the two power terminals PT1 and PT2 (drains of the transistor T1 and T3) of the differential unit 204 to clamp voltages on the terminals PT1 and PT2 below the predetermined level. The clamping device 206 comprises two transistors T7 and T8, the control terminals of which are coupled to power voltage VCC (3.3V) and the substrates of which are coupled to voltage of 1V.

The voltages V1 and V2 can be clamped below 2.3V by the clamping device 206 regardless of mode. The predetermined level can be the voltage difference between the voltages on the control terminals of the transistor T7 and T8 and the substrates thereof. For example, the voltage coupled to the substrates of the transistor T7 and T8 range between 0.8V and 1.2V.

As the voltages V1 and V2 are clamped below 2.3V, the loop current leakage through the transistors T3 and T4 caused by the voltages (2.7~3.3) on the signal lines TXP and TXN in TMDS mode is prevented. Consequently, there is no current leakage between signal lines TXP and TXN and transistors T1 and T3 in TMDS mode, and thus, the output differential swing of the output driver 203 is maintained.

Figure 9:
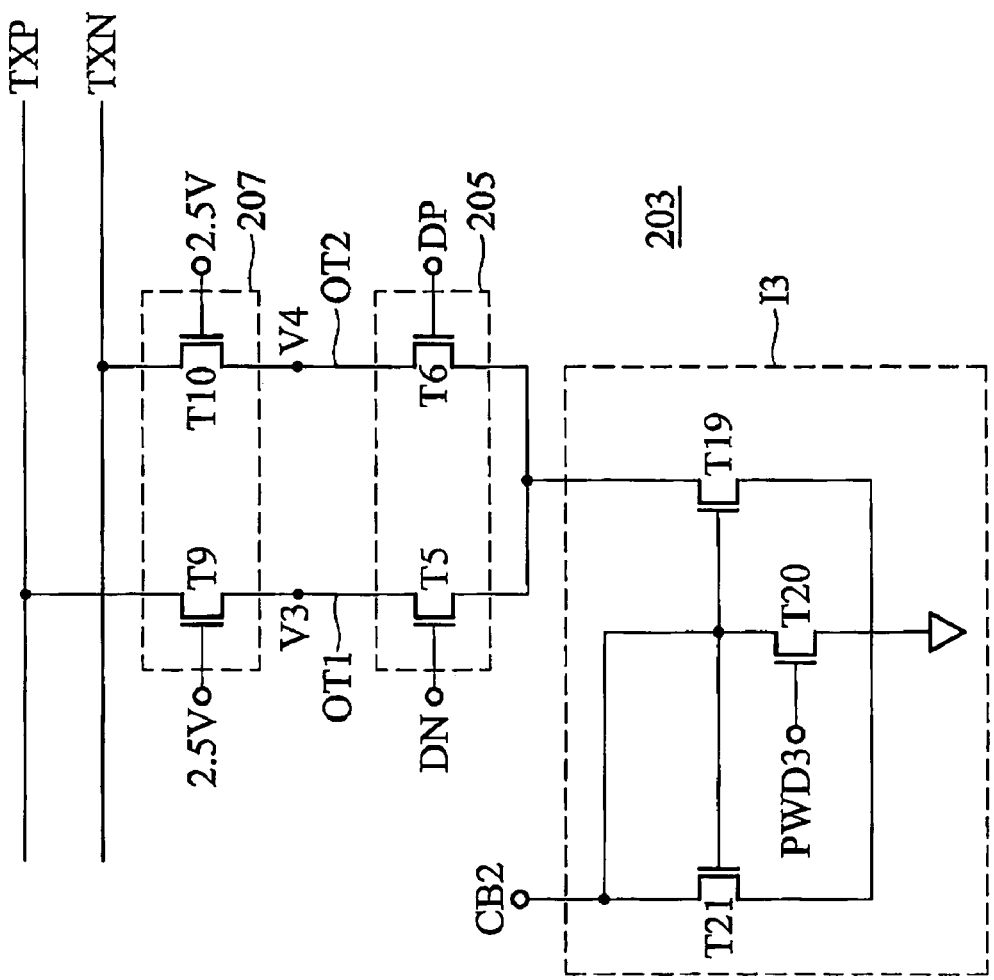
FIG. 9 shows a second output driver in the combined drive.

The current source I2 is coupled between the node N2 and the ground and comprises a transistor T16, and the control terminal of the transistor T16 is controlled by a control signal PWD2. In TMDS mode, the transistor T16 is turned off to disable the source current I2 by the control signal PWD2. FIG. 9 shows the output driver 203, coupled between the signal lines TXP and TXN and the ground. The output driver 203 is able to output a differential signal to the external input unit of a receiver (not shown) through the signal lines TXP and TXN in TMDS mode. The output driver 203 comprises a differential unit 205, a clamping device 207 and a current source I3. The differential unit 205 comprises transistors T5 and T6, generating differential signals to the signal lines TXN and TXP according to the input signals DN and DP.

The clamping device 207 is coupled between the signal lines TXN and TXP and the two output terminals OT1 and OT2 (drains of the transistor T5 and T6) of the differential unit 205 to clamp voltages on the terminals OT1 and OT2 below a predetermined level. The clamping device 205 comprises two transistors T9 and T10, the control terminals of which are coupled to the voltage of 2.5V and substrate of which are typically coupled to ground (not shown). The predetermined level can be the difference between the voltages on the control terminals of the transistor T7 and T8 and the substrates thereof. The voltages V3 and V4 can be clamped below 2.5V by the clamping device 207 regardless of mode.

The current source I3 comprises the transistors T19~T21, with drain terminals of the transistor T20 and 21 and gate terminals of the transistors T19 and T21 coupled to a bias current CB2, and control terminal of the transistor T20 controlled by a control signal PWD3.

For example, in TMDS mode, if the signals DP and DN are high and low, the transistors T5 and T6 are turned off and on respectively, such that the signal line TXN is pulled to 2.7 and the signal line TXP maintained at 3.3V, thereby creating a differential voltage at the input terminals of the corresponding external input unit, and vice versa. In LVDS mode, the control terminals of the transistors T5 and T6 are pulled low by the signals DN and DP, and the current source I3 is disabled by turning on the transistor T20 under the control signal PWD3.

Figure 10:
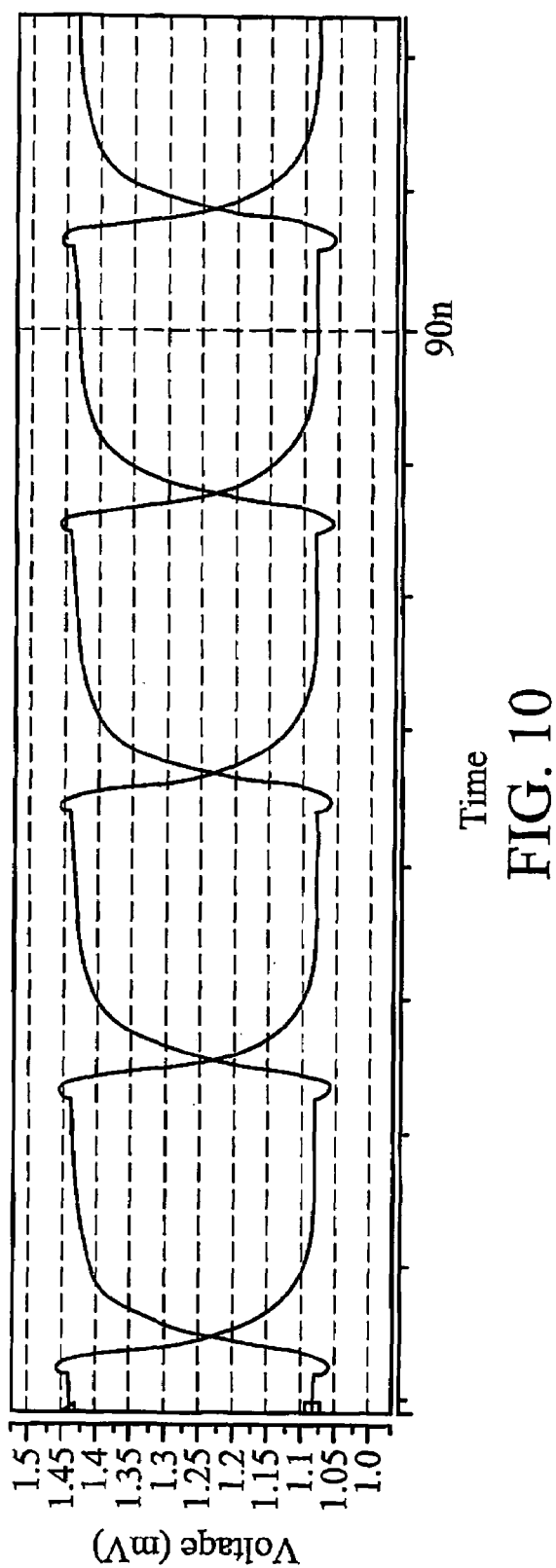
FIG. 10 is a wave diagram of output from the combined output driver in LVDS mode according to embodiments of the invention.
Figure 11:
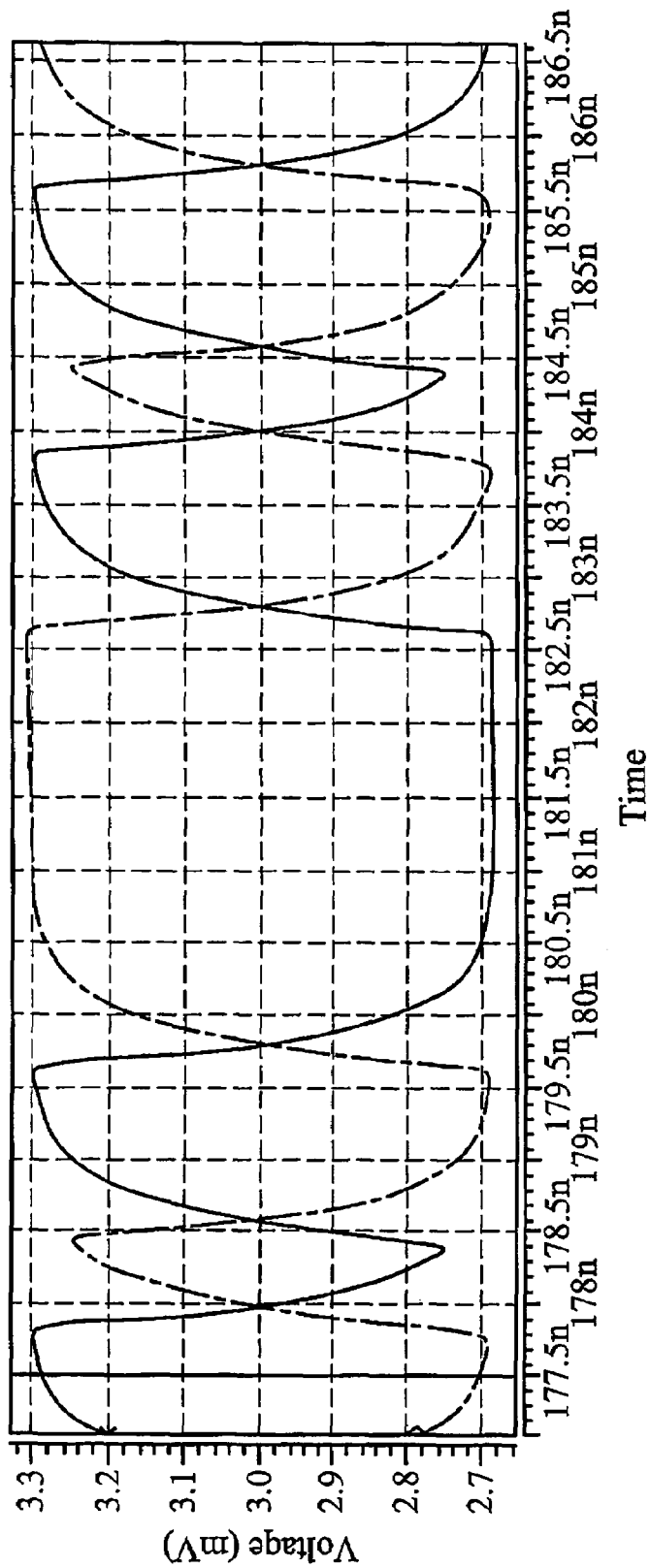
FIG. 11 is a wave diagram of output from the combined output driver in TMDS mode according to embodiments of the invention.

FIG. 10 is a wave diagram of output from the combined driver in LVDS mode. As shown, 366 mV differential swing is reached and the common voltage is strictly constrained to 1.25V in LVDS mode. FIG. 11 is a wave diagram of output from the combined driver in TMDS mode. As shown, 600 mV differential swing is reached and the common voltage is strictly constrained to 3V in TMDS mode. Thus, the combined transmitter can transmit LVDS signals, in LVDS mode and TMDS signals in TMDS mode by mode selection signal. Furthermore, current leakage between the signal lines TXP and TXN and transistors T1 and T3 in TMDS mode is prevented, and thus, the output differential swing of the output driver 202 is maintained. Namely, the two output drivers can be switched smoothly without sacrificing performance.

Furthermore, the voltages V1~V5 on the drains of the transistor T1, T2, T5, T6 and T17 can be clamped below 2.5V by the clamping devices, such that all devices in the combined output driver can meet the design rule requirement for 2.5V device. Thus, all devices in the combined output driver can be 2.5V devices applied in 0.13 um processes, thereby obtaining cost down.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A combined output driver for transmitting video signals, comprising:
   a first output driver outputting a first differential signal to a first external input unit through a pair of output signal lines according to first input signals in a first mode, the first output driver comprising:
      a first current source coupled between a first power voltage and a first node;
      a first differential unit generating the first differential signal according to the first input signals and comprising two power terminals; and
      a first clamping device coupled between the first node and the first differential unit to clamp potentials at the two power terminals below a second power voltage; and
   a second output driver outputting a second differential signal to a second external input unit through the pair of output signal lines according to second input signals in a second mode.

2. The combined output driver as claimed in claim 1, wherein the first output driver further comprises a second current source coupled between the first differential unit and a third power voltage.

3. The combined output driver as claimed in claim 2, wherein the second output driver comprises:
   a second differential unit generating the second differential signal according to second input signals, and comprising two output terminals; and
   a second clamping device coupled between the pair of output signal lines and the second differential unit clamping potentials at the two output terminals below the second power voltage.

4. The combined output driver as claimed in claim 3, wherein the second output driver further comprises a third current source coupled between the second differential unit and the third power voltage.

5. The combined output driver as claimed in claim 4, wherein the first clamping device comprises:
   a first NMOS transistor coupled between the first node and one of the two power terminals, comprising a control terminal coupled to the first power voltage and a substrate coupled to a fourth power voltage; and
   a second NMOS transistor coupled between the first node and the other of the two power terminals, comprising a control terminal coupled to the first power voltage and a substrate coupled to the fourth power voltage.

6. The combined output driver as claimed in claim 5, wherein the first power voltage exceeds the second power voltage, and the second power voltage exceeds the third power voltage.

7. The combined output driver as claimed in claim 6, wherein the fourth power voltage is substantially equal to the difference between the first power voltage and the second power voltage, and the third power voltage is grounded.

8. The combined output driver as claimed in claim 2, wherein the second clamping device comprises:
   a third NMOS transistor coupled between one of the output signal lines and one of the output terminals; and
   a fourth NMOS transistor coupled between the other output signal line and the other output terminal, wherein control terminals of the third and fourth NMOS transistors are coupled to the second power voltage.

9. The combined output driver as claimed in claim 8, wherein the first differential unit comprises:
   a first PMOS transistor comprising a first terminal, serving one of the power terminals, coupled to the first NMOS transistor;
   a fifth NMOS transistor coupled to the first PMOS transistor, wherein control terminals of the first PMOS transistor and the fifth NMOS transistor are coupled to one of the first input signals, and second terminal of the first PMOS transistor and first terminal of the fifth NMOS transistor are coupled to one of the output signal lines;
   a second PMOS transistor comprising a first terminal, serving the other power terminal, coupled to the second NMOS transistor; and
   a sixth NMOS transistor coupled between the second PMOS transistor, wherein control terminals of the second PMOS transistor and the sixth NMOS transistor are coupled to the other first input signal, and second terminal of the second PMOS transistor and the first terminal of the sixth NMOS transistor are coupled to the other output signal line.

10. The combined output driver as claimed in claim 8, wherein the second differential unit comprises:
    a seventh NMOS transistor comprising a first terminal, serving one of the output terminals, coupled to the third NMOS transistor and a control terminal coupled to one of the second input signals;
    an eighth NMOS transistor comprising a first terminal, serving the other output terminal, coupled to the fourth NMOS transistor and a control terminal coupled to the other second input signal, wherein second terminals of the seventh and eighth NMOS transistors are coupled to the third current source.

11. The combined output driver as claimed in claim 1, wherein the first output driver is a LVDS driver.

12. The combined output driver as claimed in claim 1, wherein the second output driver is a TMDS driver.

13. A combined output driver for transmitting video signals, comprising:
    a first output driver outputting a first differential signal to a first external input unit through a pair of output signal lines according to first input signals in a first mode, the first output driver comprising:
       a first differential unit generating the first differential signal according to the first input signals, and comprising two output terminals; and
       a first clamping device coupled between the pair of output signal lines and the first differential unit to clamp potentials at the two output terminals below a first power voltage; and
    a second output driver outputting a second differential signal to a second external input unit through the pair of output signal lines according to second input signals in a second mode.

14. The combined output driver as claimed in claim 13, wherein the first output driver further comprises a first current source coupled between the first differential unit and a second power voltage.

15. The combined output driver as claimed in claim 14, wherein the second output driver comprises:
    a second current source coupled between a third power voltage and a first node;
    a second differential unit generating the second differential signal according to the second input signals and comprising two power terminals; and a second clamping device coupled between the first node and the second differential unit to clamp potentials at the two power terminals below the first power voltage.

16. The combined output driver as claimed in claim 15, wherein the second output driver further comprises a third current source coupled between the second differential unit and the second power voltage.

17. The combined output driver as claimed in claim 14, wherein the first clamping device comprises:
   a first NMOS transistor coupled between one of the output signal lines and one of the output terminals;
   a second NMOS transistor coupled between the other output signal line and the other output terminal, wherein control terminals of the first and second NMOS transistors are coupled to the first power voltage.

18. The combined output driver as claimed in claim 17, wherein the second clamping device comprises:
   a third NMOS transistor coupled between the first node and one of the power terminals, comprising a control terminal coupled to the third power voltage and a substrate coupled to a fourth power voltage; and
   a fourth NMOS transistor coupled between the first node and the other of the two power terminals, comprising a control terminal coupled to the third power voltage and a substrate coupled to the fourth power voltage.

19. The combined output driver as claimed in claim 18, wherein the third power voltage exceeds the first power voltage, and the first power voltage exceeds the second power voltage.

20. The combined output driver as claimed in claim 19, wherein the fourth power voltage is substantially equal to the difference between the third power voltage and the first power voltage, and the second power voltage is grounded.

21. The combined output driver as claimed in claim 18, wherein first differential unit comprises:
   a fifth NMOS transistor comprising a first terminal, serving one of the output terminals, coupled to the first NMOS transistor and a control terminal coupled to one of the first input signals; and
   a sixth NMOS transistor comprising a first terminal, serving the other output terminal, coupled to the second NMOS transistor and a control terminal coupled to the other first input signal, wherein second terminals of the fifth and sixth NMOS transistors are coupled to the first current source.

22. The combined output driver as claimed in claim 18, wherein the second differential unit comprises:
   a first PMOS transistor comprising a first terminal, serving one of the power terminals, coupled to the third NMOS transistor;
   a seventh NMOS transistor coupled between the first PMOS transistor, wherein control terminals of the first PMOS transistor and the seventh NMOS transistor are coupled to one second input signal and second terminal of the first PMOS transistor and first terminal of the seventh NMOS transistor are coupled to one output signal line;
   a second PMOS transistor comprising a first terminal, serving the other power terminal, coupled to the fourth NMOS transistor; and
   an eighth NMOS transistor coupled between the second PMOS transistor, wherein control terminals of the second PMOS transistor and the eighth NMOS transistor are coupled to the other second input signal and second terminal of the second PMOS transistor and first terminal of the eighth NMOS transistor are coupled to the other output signal lines.

23. The combined output driver as claimed in claim 13, wherein the first output driver is a TMDS driver.

24. The combined output driver as claimed in claim 23, wherein the second output driver is a LVDS driver.

* * * * *